United States Patent [19]
Holderbaum

[11] 3,777,640
[45] Dec. 11, 1973

[54] REMOTE INDICATOR FOR DIAPHRAGM SETTING OR THE LIKE

[75] Inventor: Karl-Heinz Holderbaum, Bad Kreuznach, Germany

[73] Assignee: Jos. Schneider & Co., Optische Werke (Rhld), Germany

[22] Filed: June 2, 1972

[21] Appl. No.: 259,225

[30] Foreign Application Priority Data
Feb. 9, 1972 Germany................... P 22 05 976.3
June 24, 1971 Germany................... P 21 31 374.6

[52] U.S. Cl............................................... 95/11 R
[51] Int. Cl............................................. G03b 19/02
[58] Field of Search........................ 95/11 R, 64 R; 116/114 J

[56] References Cited
UNITED STATES PATENTS
3,518,927   11/1972   Mehlitz et al...................... 95/64 X Primary Examiner—Samuel S. Matthews
Assistant Examiner—Michael L. Gellner
Attorney—Karl F. Ross et al.

[57] ABSTRACT

A photographic objective, used for reproduction purposes in a darkroom, has an iris diaphragm whose control ring is mechanically coupled with a movable arm sweeping a contact arc inside the camera; the setting of the diaphragm can be read on an external indicator, connected to the contact arc and the arm through a cable, which includes a light box emitting filtered light to which the copying paper is insensitive. The contact arc, which may be a set of bank contacts or a continuous resistance, is carried on an insulating plate which may be removably seated in a slot of the camera housing with a plug-in connection.

10 Claims, 8 Drawing Figures

3,777,640

REMOTE INDICATOR FOR DIAPHRAGM SETTING OR THE LIKE

My present invention relates to a photographic objective, particularly in a camera used for reproduction (e.g., enlargement) purposes, in which the setting of a diaphragm or other adjustable component is to be checked from a remote location.

In the photographic enlargement of originals, for example, the operator developing the exposed photosensitive paper in a darkroom or under reduced illumination may find it desirable to verify and possibly to readjust (by conventional remote-control means) the setting of the diaphragm while viewing the emerging picture, thus without leaving the developing station in order to look at the camera.

Thus, it is an object of my invention to provide conveniently readable means for ascertaining the setting of a diaphragm or other adjustable component (e.g., of a focusing ring or a varifocal attachment) at a location distant from the camera.

A more particular object is to provide an indicator of this character whose readings are visible even in the dark without, however, detrimentally affecting photosensitive film or paper being handled nearby.

It is also an object of my invention to provide a remote indicator of this description whose readings remain visible even after the termination of exposure.

These objects are realized, in accordance with my invention, by the provision of a monitoring device in the camera housing including a conductive member such as a switch arm mechanically entrained by the control element for the component whose setting is to be ascertained, this member engaging contact means connected by one or more wires to a remote indicator.

The contact means could be a set of individual bank contacts, arrayed on a dielectric carrier plate and tied to respective lamps in the indicator, or a continuous resistance operating as a potentiometer and connected in a bridge circuit.

If, as is usually the case, the control element for the adjustable component (e.g., diaphragm) is a ring centered on the optical axis of the camera objective, the bank contacts or the potentiometer resistance may be disposed in an arc centered on that axis so as to be swept by a contactor entrained by that ring.

For use in a darkroom or a dimly illuminated developing station, the indicator is advantageously provided with means for filtering the light emitted by its lamp or lamps so as to suppress wavelengths optically affecting the emulsion of the photographic film or paper being developed. Such a filter may be positioned next to a window or group of windows through which a set of numerical indicia, representing the various settings of the monitored component, are visible; to accommodate different types of objective, these indicia may be carried on a removable strip positioned inside a light box forming part of the indicator.

According to a further feature of the invention, the contact-carrying plate may be detachably mounted in the camera housing by being clamped between two relatively movable housing parts forming a lateral access slot and a seat; advantageously, in such a case, the plate and an adjoining housing surface are equipped with mating connectors of the plug-and-jack type to complete a circuit from the contact means and the movable conductor member to an external power source such as a battery.

The above and other features of my invention will be described in detail hereinafter with reference to the accompanying drawing in which.

Figures 1, 2:
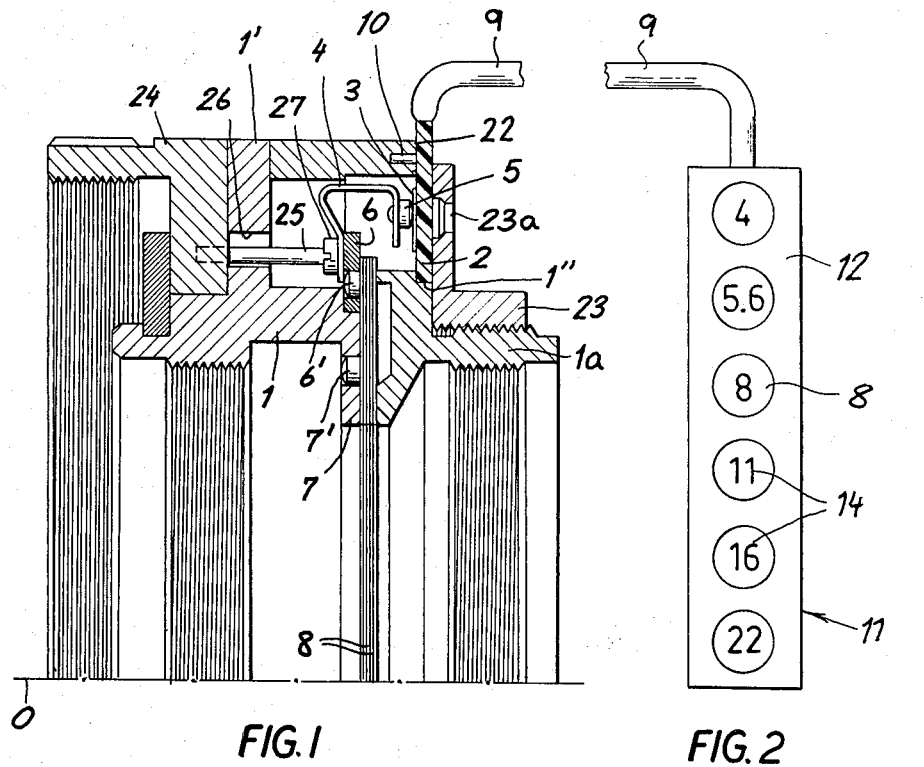
FIG. 1 is a somewhat diagrammatic axial sectional view of the upper half of a camera housing provided with an iris diaphragm and a monitoring device according to the invention.
FIG. 2 is a face view of a position indicator, remote from the camera of FIG. 1, which is connected to the monitoring device by a cable.

In FIG. 1 I have shown at 1 the housing of a conventional camera, e.g., for enlargement work, whose objective (not shown) is centered on an optical axis 0. Also centered on this axis is a conventional iris diaphragm including a mounting ring 7 integral with camera housing 1, a control ring 6 rotatable about axis 0, and a set of iris leaves 8 pivoted by pins 6' and 7' to rings 6 and 7, respectively. Control ring 6 can be rotated by a milled setting ring 24 linked with it through a rod 25 which passes in axial direction through a slot 26 in a flange 1' of the housing 1.

In accordance with the present invention, the positioning of the control ring 6 is monitored by an assembly including a dielectric carrier plate 2 provided with a set of bank contacts 3 (see also FIGS. 3 and 7), these contacts being disposed in an arc centered on axis 0 in order to be swept by a switch arm 4 rigid with ring 6 to which it is secured by a screw 27.

Figure 7:
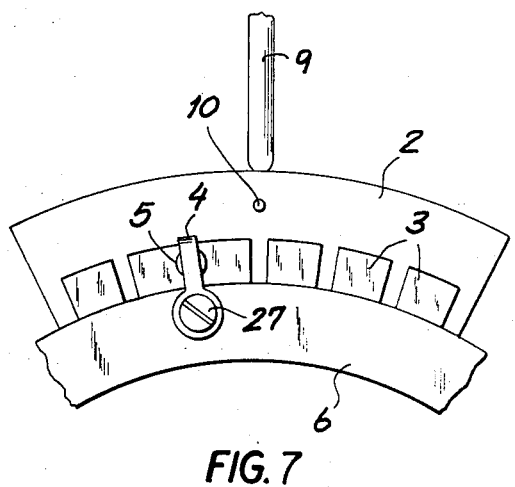
FIG. 7 is a face view of the monitoring device included in the camera housing of FIG. 1.

As seen in FIG. 7, plate 2 has the shape of a ring segment (though it could also be constituted by a complete ring or by a series of such segments) which is centered on the axis 0 and hugs a rabbet 1'' (FIG. 1) of housing 1 forming a seat therefor. Plate 2 rests with its forward face against an annular shoulder 22 of the housing and carries a pin 10 plugged into a mating bore of that shoulder. This plug-in connection completes an energizing circuit for the device 2-4 including an external power source shown in FIG. 3 as a battery 15. In this particular instance, the connector 10 merely serves as a ground lead from the camera housing 1 to a terminal (here the negative one) of that battery. The individual bank contacts 3 are returned to the positive battery terminal by way of respective conductors forming part of a cable 9 and extending to respective lamps 16 in an indicator 11.

Figures 3, 8:
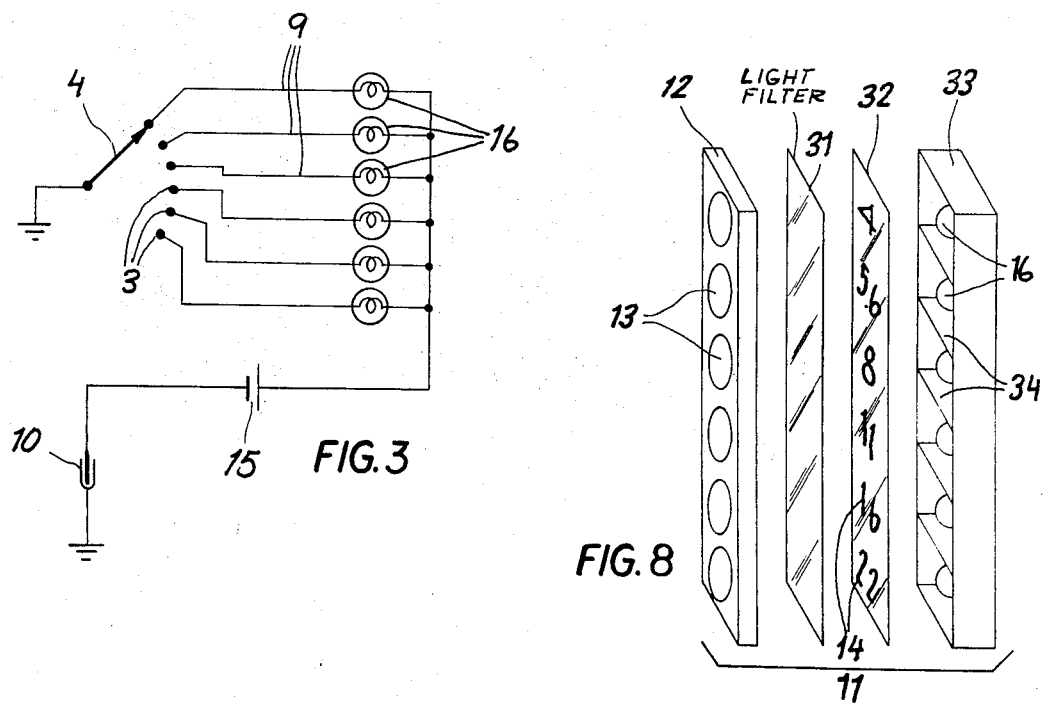
FIG. 3 is a circuit diagram of the monitoring device of FIG. 1 feeding a set of associated light sources in the indicator of FIG. 2.
FIG. 8 is an exploded perspective view of the indicator illustrated in FIG. 2.

As illustrated in FIGS. 2 and 8, indicator 11 comprises a light box 33 subdivided by partitions 34 into compartments for the lamps 16; the box 33 has a cover 12 formed with a number of windows 13 (here six), one for each lamp, the windows being separated from the lamps by a transparent strip 32 carrying numerical indicia 14 and by an adjoining light-filtering strip 31. It will be understood that strips 31 and 32 could be integral with each other or that the windows 13 could be covered by such filter material.

In operation, the instantaneous position of control ring 6 and therefore of diaphragm 8 is communicated to switch arm 4 which, for any of six discrete stop positions, engages a corresponding bank contact 3 to light the associated lamp 16: by thus transluminating the strips 31 and 32, the lamp displays the selected stop number in the respective window.

In FIG. 7 it will be noted that switch arm 4 terminates in a contactor head 5 which is wide enough to bridge adjoining bank contacts 3 so that intermediate stop positions can be indicated by the simultaneous lighting of two lamps 16.

Figure 4:
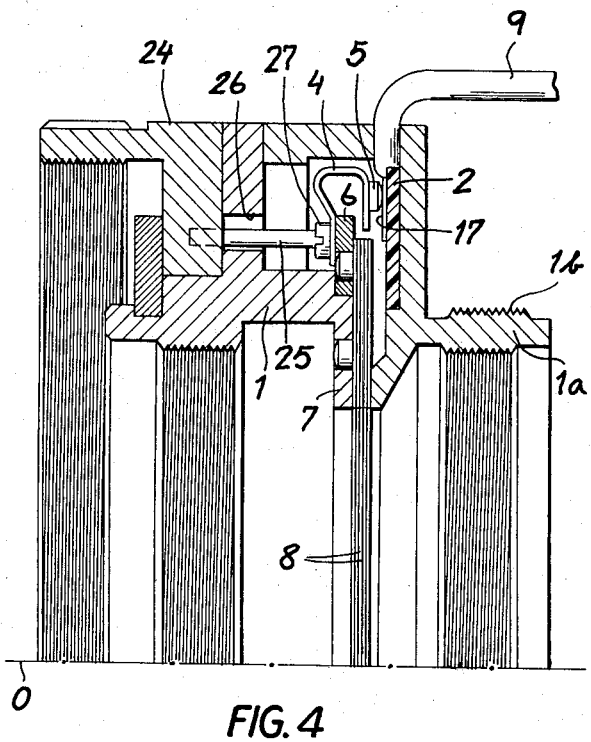
FIG. 4 is a view similar to FIG. 1, showing a modification.
Figure 5:
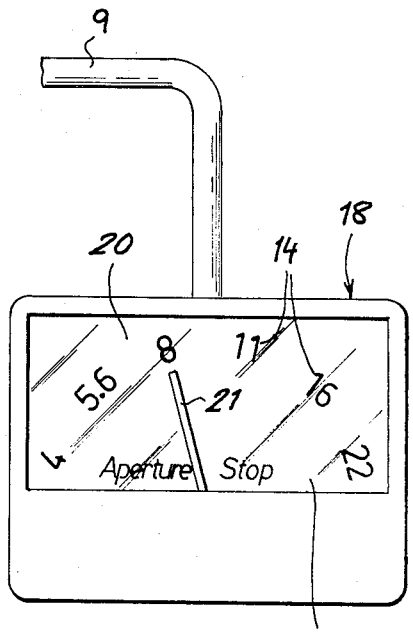
FIG. 5 is a view similar to FIG. 2, illustrating a modified indicator.
Figure 6:
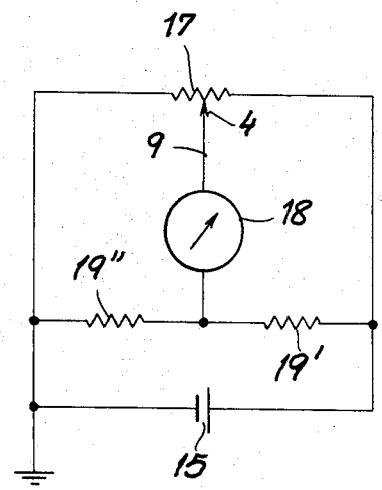
FIG. 6 is a circuit diagram similar to FIG. 3 but relating to the monitoring device and indicator of FIGS. 4 and 5.

FIGS. 4–6 show a similar arrangement wherein, however, the dielectric plate 2 supports a resistive layer 17 connected in a bridge circuit with two extraneous resistors 19', 19'', the reading of the monitoring devices 2, 4 being here given by an indicator 18 in the form of a voltmeter connected via cable 9 in an output diagonal of the bridge whose input diagonal is energized by the battery 15. Voltmeter 18 has a window 20 through which a needle 21, playing on a scale of numerical indicia 14, is visible; scale 14 may again be transparent and juxtaposed with a filter strip for the purpose described above. This scale, like the supporting strip 32 of FIG. 8, may be exchangeable in order to accommodate objectives with different diaphragm stops. Threads 1b on a rear flange 1a of housing 1 serve for the fastening thereof to a nonillustrated rear part of the camera.

The mounting of plate 2 has been shown in FIG. 1 as including a retaining ring 23 which is threaded onto the rear flange 1a of housing 1 and presses the plate 2 against the annular shoulder 22; ring 23 has several apertures 23a (only one shown) by which the housing can be bolted onto the rear part of the camera. The slot formed by shoulder 22 and ring 23 is, of course, fully obstructed by the inserted plate so that no outside light will penetrate into the camera housing. FIG. 4 illustrated the plate 2 as fully enclosed by the housing, with only the cable 9 emerging, yet it will be apparent that the mounting of FIG. 1 can be used also in this instance.

I claim:

1. In a camera equipped with an adjustable component inside a housing, the combination therewith of a control element for said component in said housing, a conductive member mechanically coupled with said control element for displacement thereby in said housing, a dielectric plate, detachable mounting means for removably seating said plate in said housing, contact means positioned on said plate for engagement by said member, indicating means remote from said housing, and wire means electrically connecting said member and said contact means to said indicating means for registering the position of said member.

2. The combination defined in claim 1 wherein said control element is a ring centered on an optical axis, said contact means being disposed in an arc coaxial with said ring.

3. The combination defined in claim 1 wherein said housing forms a seat for said plate, said seat and said plate being provided with mating connector means for completing a circuit through said wire means to said indicator means upon insertion of said plate into said housing.

4. In a camera equipped with an adjustable component inside a housing, the combination therewith of a control element for said component in said housing, a conductive member mechanically coupled with said control element for displacement thereby in said housing, contact means positioned for engagement by said member, a carrier for said contact means in said housing, indicator means remote from said housing, and wire means electrically connecting said member and said contact means to said indicator means for registering the position of said member; said adjustable component being a diaphragm with a plurality of discrete stop positions, said contact means comprising a set of bank contacts respectively engageable by said member in said stop positions.

5. The combination defined in claim 4 wherein said carrier is a dielectric plate removably seated in said housing.

6. The combination defined in claim 5 wherein said housing is provided with a detachable mounting for said plate.

7. The combination defined in claim 4 wherein said indicator means comprises a plurality of light sources individually connected to said bank contacts, said member having an extremity wide enough to bridge adjoining bank contacts in intermediate positions.

8. The combination defined in claim 4 wherein said contact means comprises a continuous resistance, said indicator means including impedance means complementing said resistance to a bridge circuit.

9. In a camera equipped with an adjustable component inside a housing, the combination therewith of a control element for said component in said housing, a conductive member mechanically coupled with said control element for displacement thereby in said housing, contact means positioned for engagement by said member, a carrier for said contact means in said housing, indicator means remote from said housing, and wire means electrically connecting said member and said contact means to said indicator means for registering the position of said member; said indicator means comprising a light box with a support for numerical indicia, at least one window for displaying said indicia, at least one source of light for illuminating said indicia, and filter means for substantially preventing light emission from said box having wavelengths optically affecting photosensitive material utilized with the camera.

10. The combination defined in claim 9 wherein said support comprises a removable strip positioned for translumination by light from said source.

* * * * *